United States Patent
Gordon et al.

(10) Patent No.: US 10,464,103 B2
(45) Date of Patent: Nov. 5, 2019

(54) SPRING MOUNT ASSEMBLY FOR A VIBRATING SCREEN

(71) Applicant: FLSmidth A/S, Valby (DK)

(72) Inventors: Christopher Gordon, Yeronga (AU); Daniel Pattinson, Brisbane (AU)

(73) Assignee: FLSmidth A/S (DK)

( * ) Notice: Subject to any disclaimer, the term of this patent is extended or adjusted under 35 U.S.C. 154(b) by 39 days.

(21) Appl. No.: 15/933,429

(22) Filed: Mar. 23, 2018

(65) Prior Publication Data

US 2019/0291137 A1     Sep. 26, 2019

(51) Int. Cl.
| | | |
|---|---|---|
| B07B 1/44 | (2006.01) | |
| B07B 1/28 | (2006.01) | |
| F16F 13/00 | (2006.01) | |
| F16F 15/02 | (2006.01) | |

(52) U.S. Cl.
CPC .......... B07B 1/44 (2013.01); B07B 1/28 (2013.01); F16F 13/007 (2013.01); F16F 15/022 (2013.01); *F16F 2230/46* (2013.01); *F16F 2232/08* (2013.01); *F16F 2234/02* (2013.01); *F16F 2236/04* (2013.01); *F16F 2238/026* (2013.01)

(58) Field of Classification Search
CPC .............. B07B 1/28; B07B 1/44; F16F 13/007
USPC ....................................................... 209/404
See application file for complete search history.

(56) References Cited

U.S. PATENT DOCUMENTS

| | | | | |
|---|---|---|---|---|
| 4,287,056 A * | 9/1981 | Dumbaugh | ............... | B07B 1/42 198/762 |
| 4,492,629 A * | 1/1985 | Dumbaugh | ............... | B07B 1/46 198/770 |
| 4,795,552 A * | 1/1989 | Yun | ........................... | B07B 1/40 209/319 |
| 5,341,939 A * | 8/1994 | Aitchison | ................. | B07B 1/42 209/319 |
| 9,757,771 B2 * | 9/2017 | Dickinson | ................. | B07B 1/44 |
| 2003/0201237 A1 * | 10/2003 | Grichar | ............. | B01D 33/0376 210/785 |
| 2017/0312784 A1 * | 11/2017 | Grose, II | .................. | B07B 1/44 |

* cited by examiner

Primary Examiner — Terrell H Matthews
(74) Attorney, Agent, or Firm — Jeffrey A. Sharp

(57) ABSTRACT

A spring mount assembly for a vibrating screen, the spring mount assembly having a helical spring; a top helical spring support disposed on the top end of the helical spring for supporting the top end of the helical spring; a bottom helical spring support disposed on the bottom end of the helical spring for supporting the bottom end of the helical spring; a stationary base support; a removable base support disposed on top of the stationary base support between the stationary base support and the bottom helical spring support; a hydraulic cylinder; side supports attached to the stationary base support; and removable posts affixed to the side supports and the top helical spring support. Also provided is a system, and a method, for removing the helical spring, the system having a hydraulic jacking arrangement for creating a gap between the bottom helical spring support and the removable base support.

16 Claims, 9 Drawing Sheets

SPRING MOUNT ASSEMBLY FOR A VIBRATING SCREEN

FIELD OF THE INVENTION

The present invention relates to a vibrating screen for the separation of materials such as ores in mining, quarrying, and mineral processing. In particular, although not exclusively, the invention relates to a spring mount assembly for a vibrating screen and a system and a method for removing and replacing helical springs in a vibrating screen.

BACKGROUND OF THE INVENTION

Vibrating screens are typically used in the mining, quarrying, and mineral processing industries to separate materials, such as coal, by size. A vibrating screen typically has a chassis with screen panels. The chassis is typically rigid with various support members to ensure structural integrity. The chassis is mounted on pedestals and springs, or the like in e.g. a spring mount assembly, and has vibrators which cause the chassis, and therefore the screen panels, to vibrate. The screen panels have apertures which allow smaller sized material to pass through. In use, the chassis vibrates and material is passed over the screen panels and smaller material is separated from larger material as it passes through the apertures in the screen panels. Examples of vibrating screens may be appreciated from U.S. Pat. Nos. 6,830,155 and 9,457,381

In some vibrating screens there are external and internal springs which are used to support the chassis. This is known as a dual spring design. Because of difficulties in performing maintenance on or changing out the internal springs some vibrating screens are now designed with only a pair of external springs. This is known as a single spring design.

Existing spring mount assemblies pose numerous issues during maintenance and change-out procedures. First, existing spring mount assemblies present a safety risk as the entire screen chassis is required to either be lifted or jacked to remove the weight from the springs and allow the springs to become free and thereafter removed. Such a process presents a risk of working under a suspended load. Second, existing spring mount assemblies are not designed such that there is enough clearance/height to relieve the spring tension and remove it from its position. Therefore, existing methods require that the springs are compressed, e.g. using spring compressors, which are classed as high risk tools and are progressively being removed from the majority of mining sites.

OBJECT OF THE INVENTION

It is an object of the invention to overcome or at least alleviate one or more of the above problems and/or provide the consumer with a useful or commercial choice.

SUMMARY OF THE INVENTION

A spring mount assembly for a vibrating screen is provided which has a helical spring having a top end and a bottom end; a top helical spring support disposed on the top end of the helical spring for supporting the top end of the helical spring; a bottom helical spring support disposed on the bottom end of the helical spring for supporting the bottom end of the helical spring; a stationary base support; a removable base support disposed on top of the stationary base support between the stationary base support and the bottom helical spring support; a hydraulic cylinder for supporting the bottom helical spring support on the stationary base support; side supports attached to the stationary base support; and removable posts affixed to the side supports and the top helical spring support.

In an exemplary embodiment of the spring mount assembly, the spring mount assembly can also have a ledge affixed to the stationary base support for supporting the removable base support when the removable base support is slidably removed out from under the bottom helical spring support and out from atop the stationary base support. In some embodiments, the ledge can be removably affixed to the stationary base support such that the ledge can be disconnected from the stationary base support when it is not in use.

In some embodiments, the removable base support may have a top shelf, a bottom shelf and support members there between. In some embodiments, the removable base support may be disposed directly on top of and adjacent to the stationary base support between the stationary base support and the bottom helical spring support.

In some embodiments, the bottom helical spring support may have a top shelf, a bottom shelf and support members therebetween.

In some embodiments, the support members may have handles attached to the support members for slidably removing the removable base support from under the bottom helical spring support.

In some embodiments, the side supports may have slots for receiving a portion of the bottom helical spring support. In some embodiments the removable posts may have tips. In some embodiments, the vibrating screen is a single spring design. In some embodiments, the gap can be between 5-10 mm. In some embodiments, the helical springs can be coated with a protectant.

Also provided is a system for removing the helical springs of the spring mount assembly. The system may have a hydraulic jacking arrangement for controlling hydraulic cylinders and for creating a gap between the bottom helical spring support and the removable base support. In some embodiments the hydraulic jacking arrangement may have one or more of the following: a hydraulic foot pump mounted on a base, a pressure gauge, an adaptor, a coupler set, a hydraulic hose with a male coupling and a load lowering valve disposed on each hydraulic cylinder.

Also provided is a method for removing the helical springs of the spring mount assembly. The method may comprise: inserting hydraulic cylinders between the bottom helical spring support and the stationary base support such that the hydraulic cylinders are supporting the bottom helical spring support on the stationary base support; inserting removable posts affixed to the side supports and the top helical spring support; using a hydraulic jacking arrangement to control the hydraulic cylinders in order to raise the bottom helical spring support such that there is a gap between the bottom helical spring support and the removable base support; removing the removable base support; lowering the bottom helical spring support such that it disposed on the stationary base support; relieving tension on the helical springs; and removing the helical springs. In some embodiments the method may also comprise re-inserting replacement helical springs; raising the botto helical spring support; re-inserting the removable base support; removing the removable posts; and lowering the bottom helical spring support such that it disposed on the removable base support. In some embodiments of the method, the step of removing the removable base support may comprises sliding the removable base support onto a ledge.

Other details, objects, and advantages of the invention will become apparent as the following description of certain present exemplary embodiments thereof and certain present exemplary methods of practicing the same proceeds.

BRIEF DESCRIPTION OF THE FIGURES

Embodiments of the invention, by way of example only, will be described with reference to the accompanying drawings in which.

DETAILED DESCRIPTION OF THE INVENTION

Figure 1A:
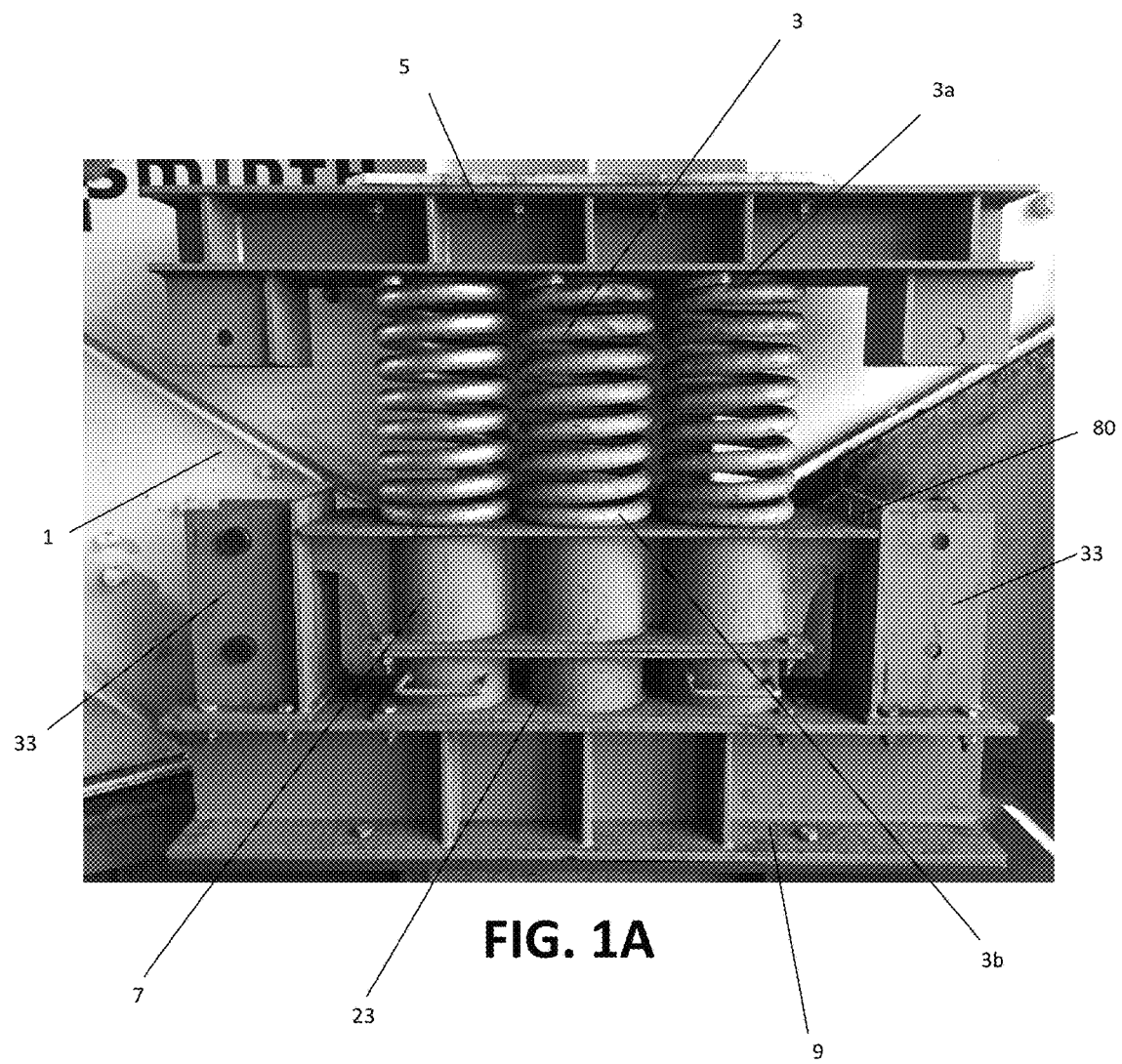
FIG. 1A shows a front-side photograph of an exemplary embodiment of the spring mount assembly.
Figure 1B:
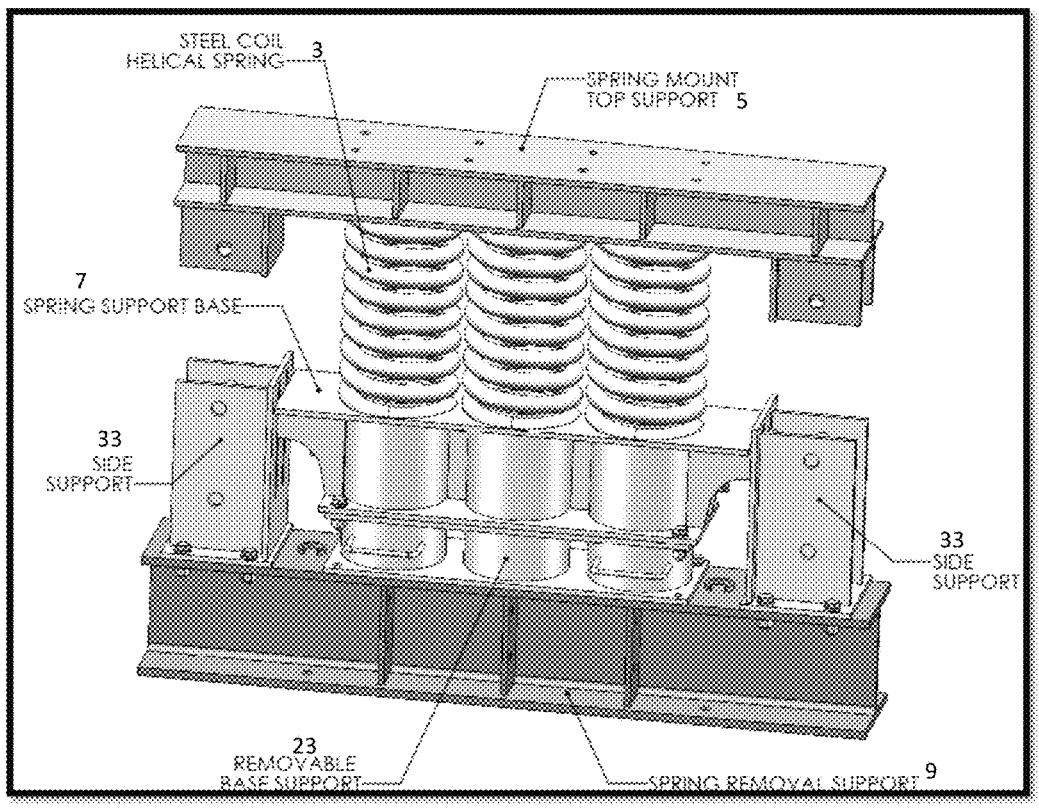
FIG. 1B shows a front view of an exemplary embodiment of the spring mount assembly.

FIGS. 1A and 1B show an exemplary embodiment of the front view of a spring mount assembly 1. The spring mount assembly 1 may have a stationary base support 9 for supporting the spring mount assembly 1 on e.g. a factory floor or mine site ground. The spring mount assembly 1 can be retrofitted to existing pedestals. A removable base support 23 can be disposed on top of the stationary base support 9. A bottom helical spring support 7 can be disposed on top of the removable base support 23 above the stationary base support 9. One or more, typically three, helical springs 3 can be mounted on the bottom helical spring support 7. The bottom end of the helical spring 3b contact the bottom helical spring support 7. The helical springs 3 can be disposed between the bottom helical spring support 7 and a top helical spring support 5 which can be disposed on the top end of the helical springs 3a for supporting the top end of the helical springs 3. As shown in e.g. FIG. 1A-1B, in some embodiments there can be one or more side supports 33 which are attached, e.g. via bolts or welding, to the stationary base support 9. The side supports 33 can have inward facing guide slots 80 for receiving a portion of the bottom helical spring support 7 such that the guide slots 80 are designed to guide the longitudinal movement of the bottom helical spring support 7 when the removable base support 23 is removed from out from under the bottom helical spring support 7 and out from atop the stationary base support 9. The side supports 33 can also be designed to have a receiving portion or cutout for receiving one or more removable posts 35 which can be attached to the side supports 33 and the top helical spring support 5. In some embodiments, the removable posts 35 can be affixed and locked into place on the side supports 33 using locking and/or retainer pins. The bottom helical spring support 7 and removable base support 23 can have corresponding column like structures or support members 8, 25 which correspond to the outer circumferential dimensions of the helical springs 3. Further, in some embodiments, the support members 8, 25 are disposed between a top 7a, 23a and bottom 7b, 23b shelf of the bottom helical spring support 7 or removable base support 23. The support members 25 of the removable base support 23 can have handles 27 for assisting with removal of the removable base support 23. The helical springs 3 can be mounted via the bottom on the bottom helical spring support 7 using spring spigots which act as guide and locking mechanisms to laterally position the helical springs 3 onto the bottom helical spring support 7 and via the top on the top helical spring support 5 using spring spigots which act as guide and locking mechanisms to laterally position the helical springs onto the top helical spring support 5. As further shown in FIG. 1A and FIG. 1B, the top helical spring support 5 and stationary base support 9 are constructed as I-beams with flanges. The vibrating screen can be affixed, e.g. via bolts CO, to the top portion of the top helical spring support 5. In addition, the removable base support 23 can be affixed, e.g. via bolts 60, to the stationary base support 9 and the bottom helical spring support 7 can be affixed, e.g. via bolts 60, to the removable base support 23.

Figure 2:
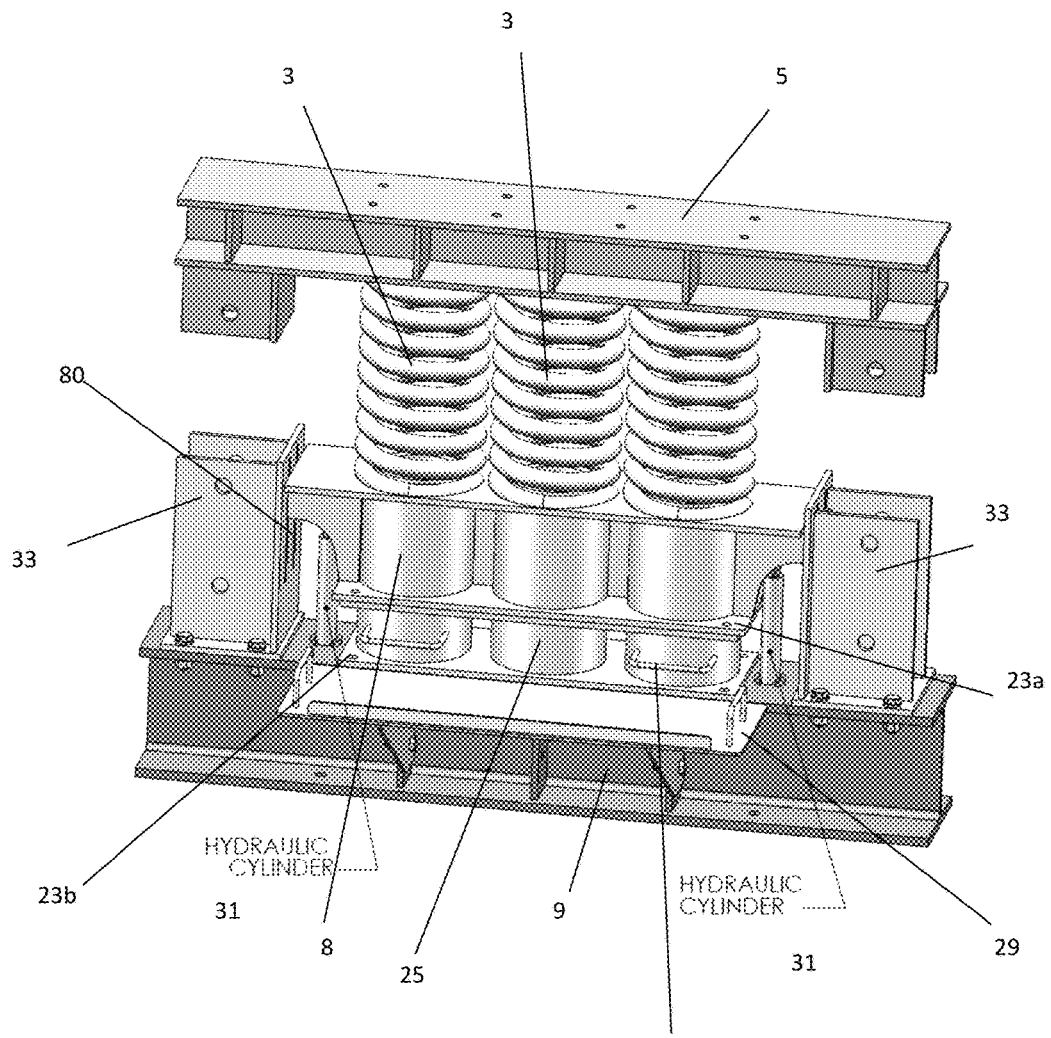
FIG. 2 shows a front view of an exemplary embodiment of the spring mount assembly having hydraulic cylinders and a ledge.
Figure 3:
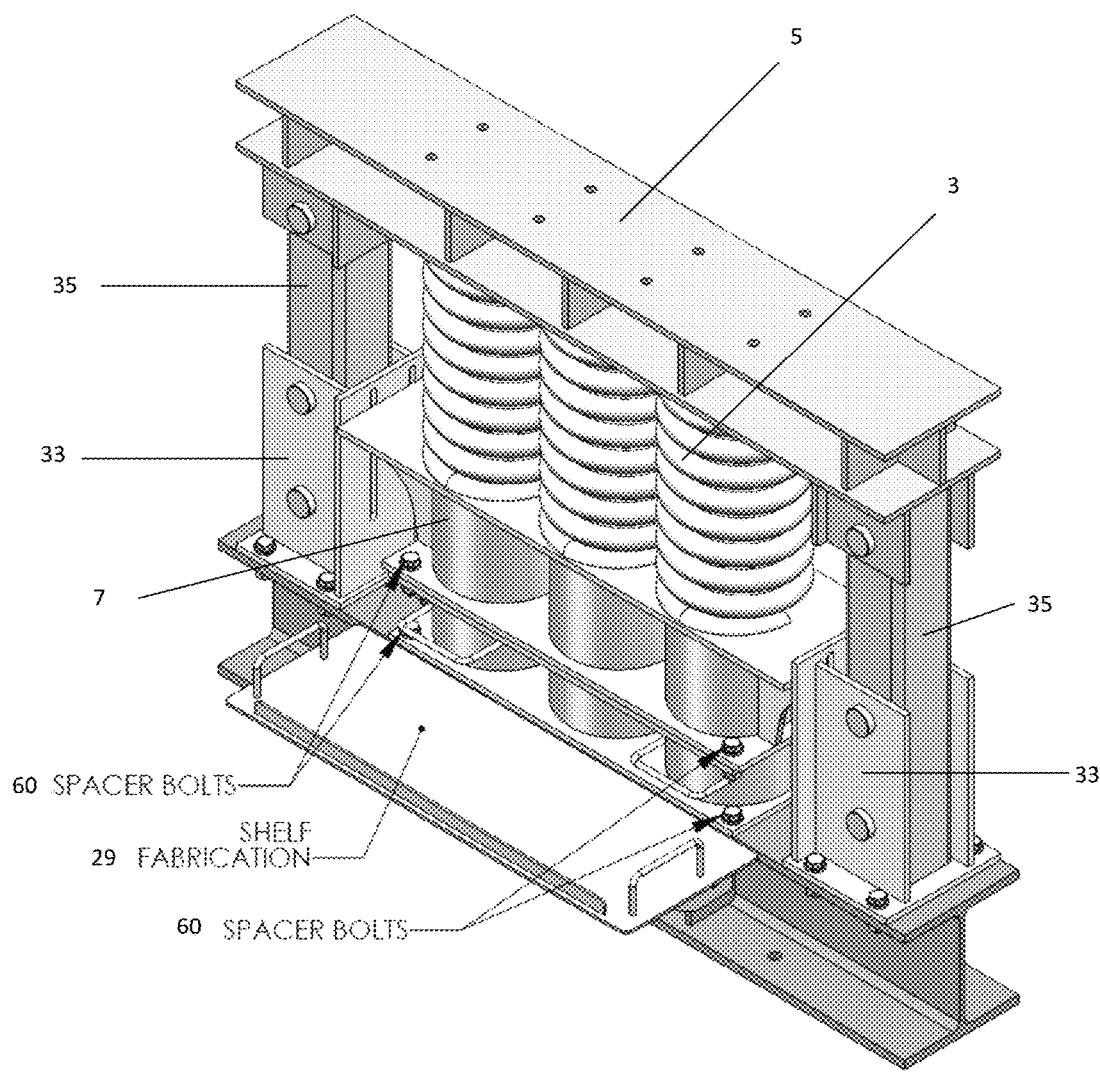
FIG. 3 shows a front view of an exemplary embodiment of the spring mount assembly where the removable base support has not been removed.
Figure 4:
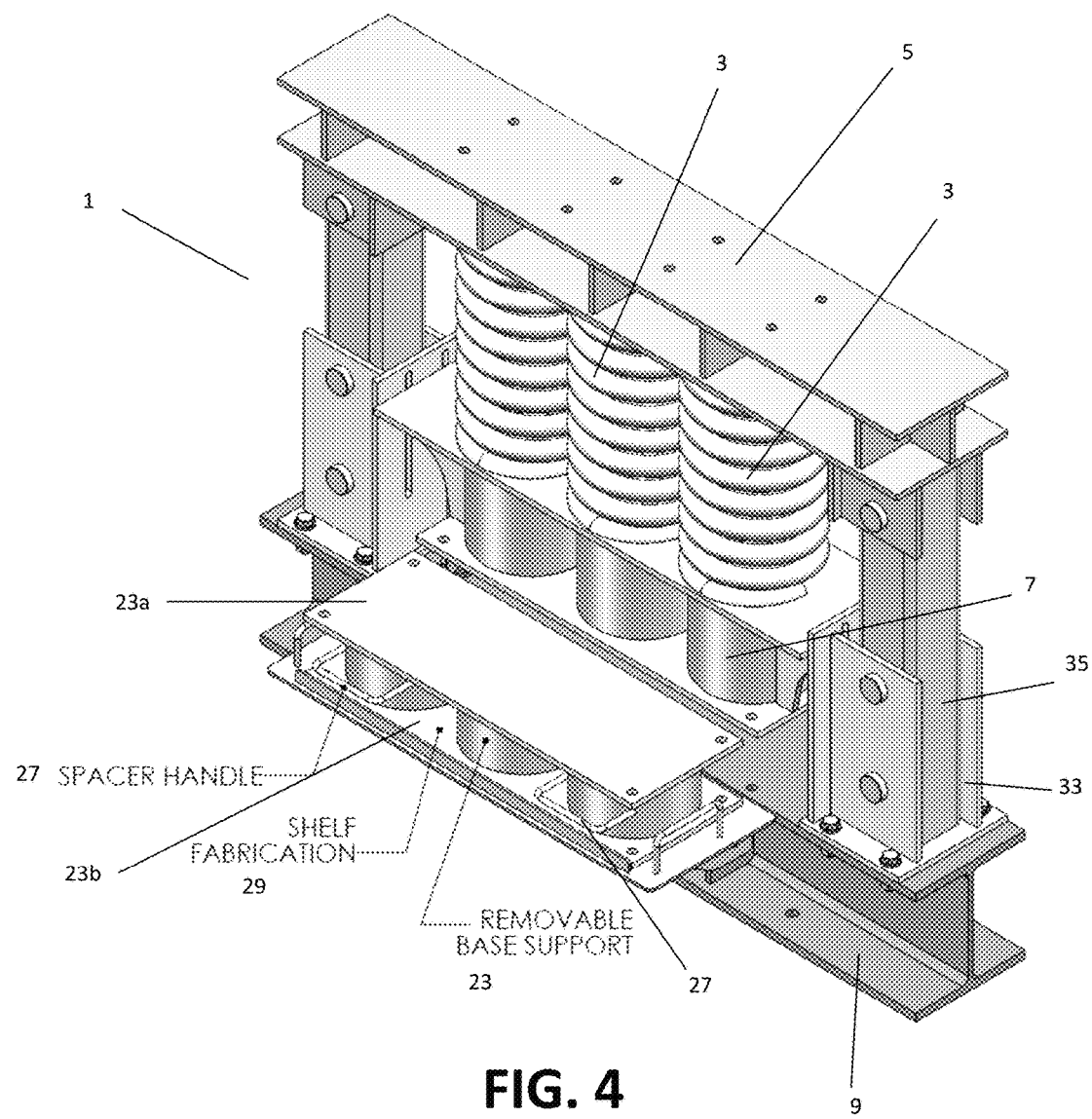
FIG. 4 shows a front view of an exemplary embodiment of the spring mount assembly where the removable base support has been removed.
Figure 5:
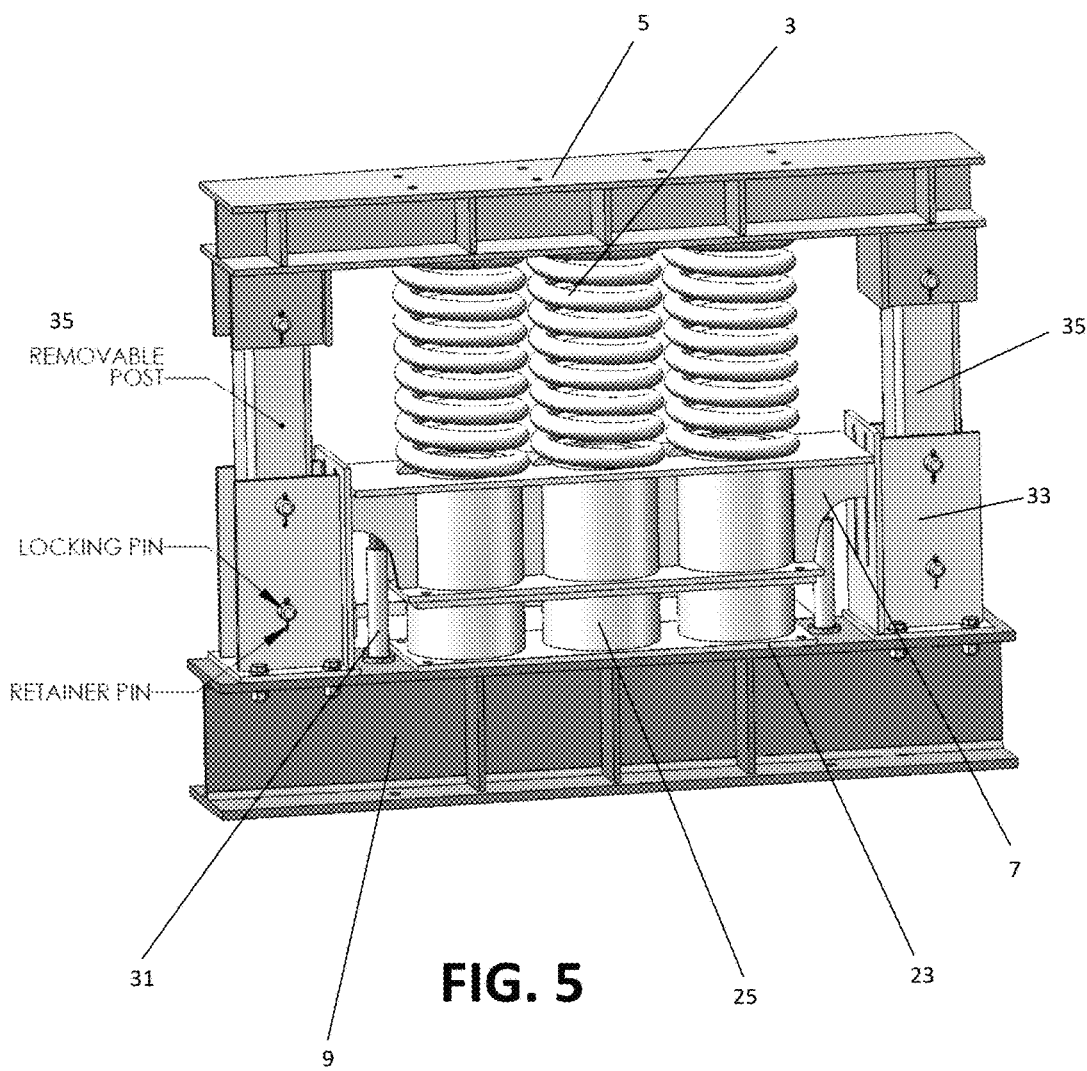
FIG. 5 shows a rear view of an exemplary embodiment of the spring mount assembly having hydraulic cylinders where the removable base support has not been removed.

Referring now to FIG. 2, in some embodiments the spring mount assembly 1 may have one or more, typically two, hydraulic cylinders 31 which can be mounted on the top portion of the stationary base support 9. The hydraulic cylinders 31 support the weight of the bottom helical spring support 7, with e.g. the weight of the helical springs 3, when the removable base support 23 is slidably removed from out from under the bottom helical spring support 7. In some embodiments, the spring mount assembly 1 may have a ledge 29 which can e.g. be affixed to the stationary base support 9 for supporting the removable base support 23 when it is removed from out from under the bottom helical spring support 7. The ledge 29 may be attached to the flanges of the stationary base support 9. The ledge 29 may be rotatable such that it is positioned on the same plane of the bottom shelf of the removable base support 23b when it is desired to remove the removable base support 23 and positioned lower than the plane when it is not in use. The ledge 29 may also have handles 27, e.g. located at each lateral end for positioning the ledge and a stop plate positioned at the front end of the ledge 29 for stopping the removable base support from sliding off of the front of the ledge 29.

Figure 6:
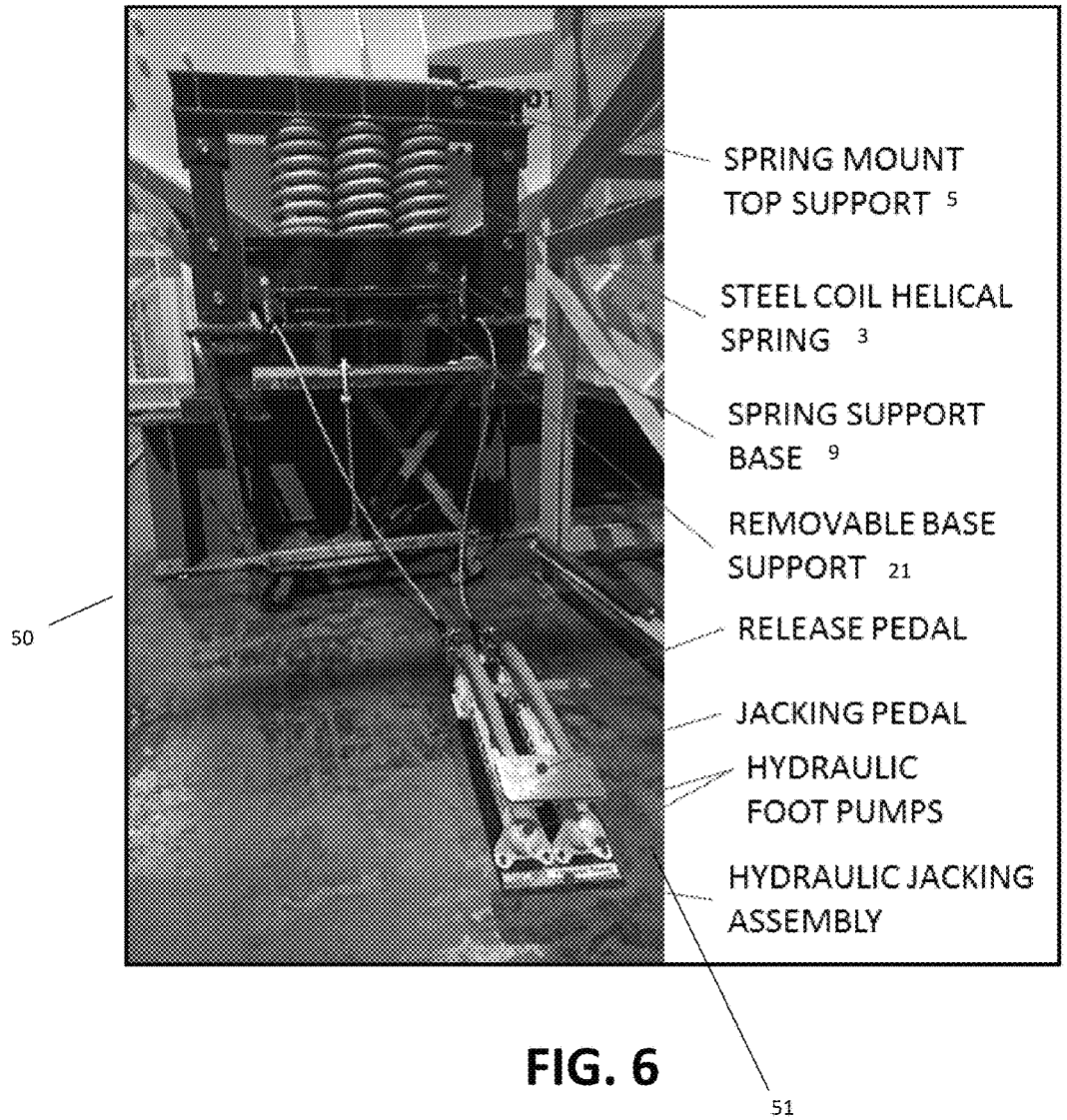
FIG. 6 shows a front-side photograph of an exemplary embodiment of the system.
Figure 7:
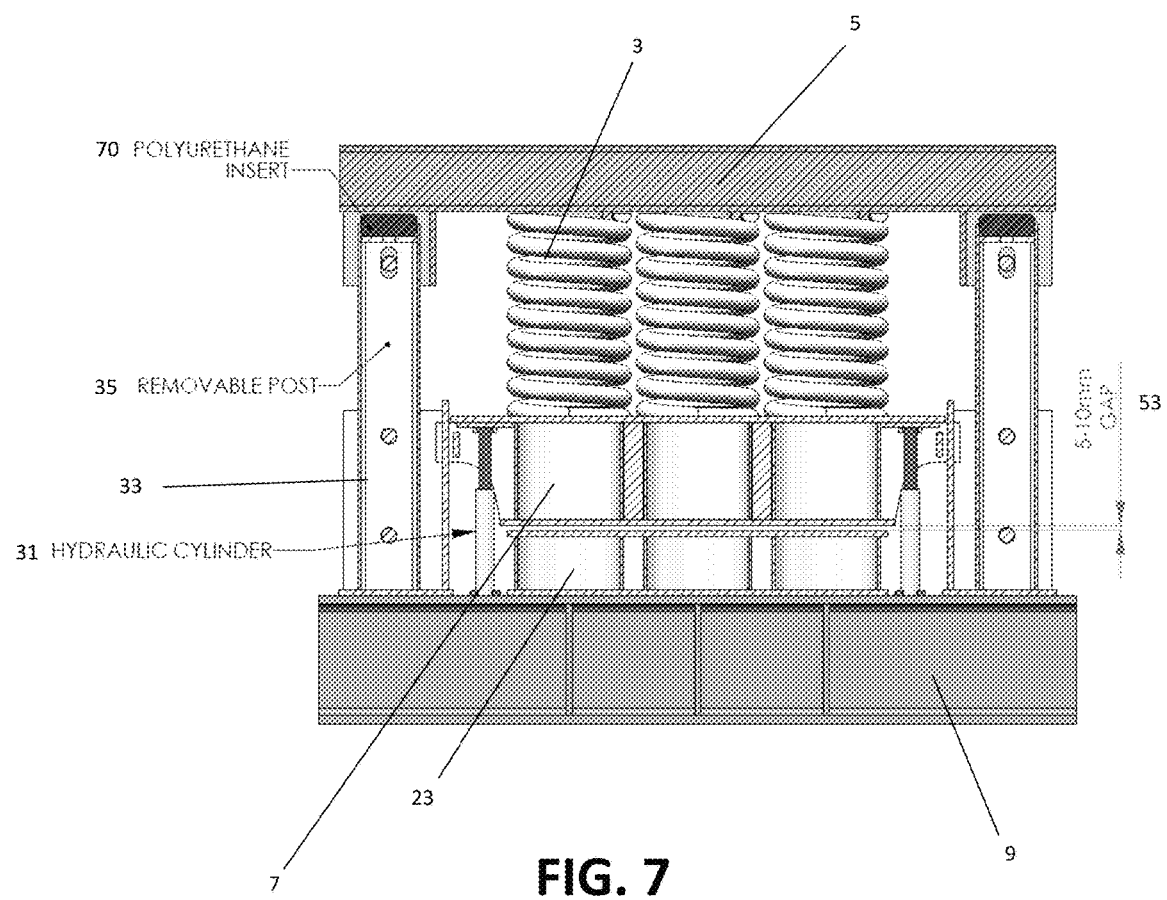
FIG. 7 shows a rear view of an exemplary embodiment of the spring mount assembly having hydraulic cylinders where the system has been used to create a gap between the bottom helical spring support and the removable base support.
Figure 8:
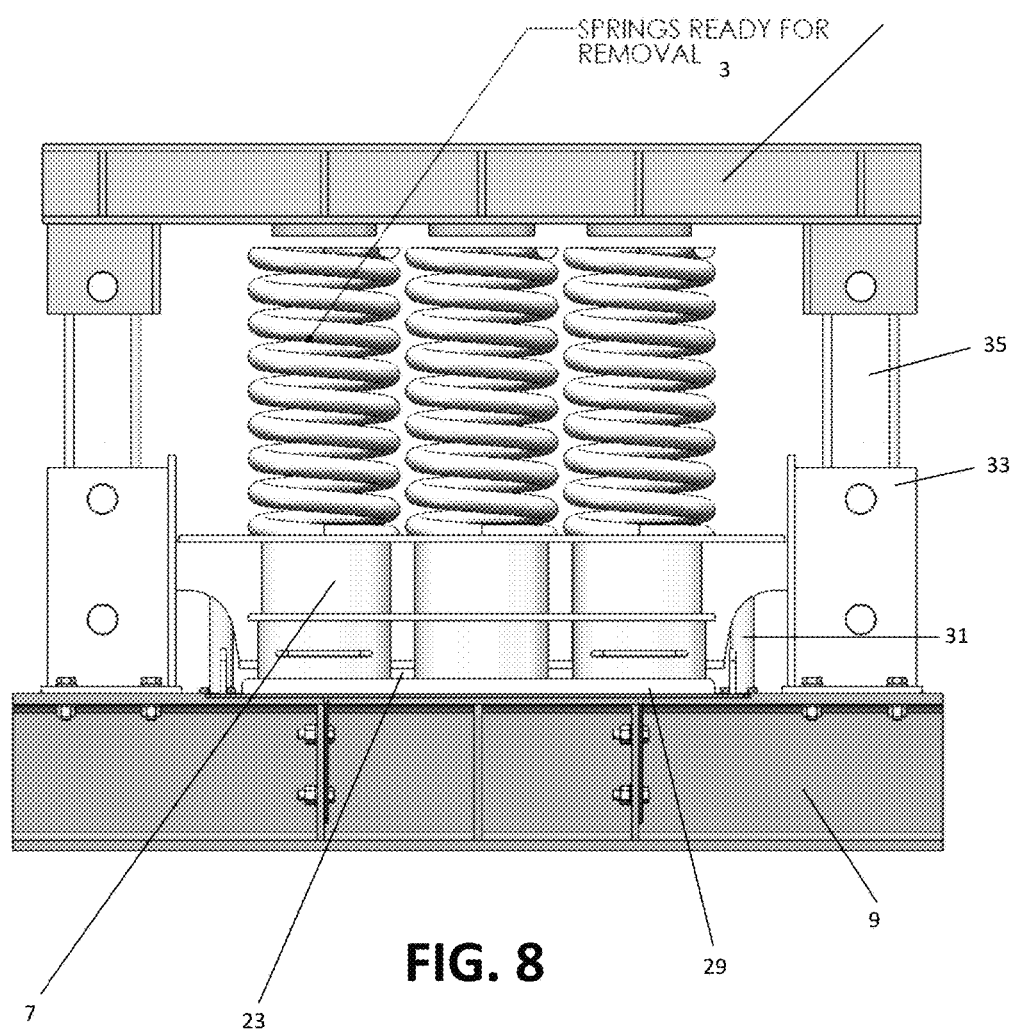
FIG. 8 shows a front view of an exemplary embodiment of the spring mount assembly having hydraulic cylinders where the removable base support has been removed and the helical springs are ready for removal.

As shown in e.g. FIGS. 3-8, in some embodiments the spring mount assembly 1 may have one or more removable posts 35 which can be secured to the side supports 33 and top helical spring mount 5 with e.g. pins and retainer pins. The removable posts 35 can provide further support for the spring assembly 1 when removing the removable base support 23, In some embodiments, e.g. as shown in FIG. 7, the removable posts 35 can be fitted with tips 70, e.g. polyurethane, rubber, or another combination of poly/plastic, for accommodating small potential differences in screen levels.

As shown in FIG. 6, there can be a system 50 for removing the helical springs 3. The system 50 can have a hydraulic jacking arrangement 51 for controlling the hydraulic cylinders 31 and for creating a gap 53, as further shown in FIG. 7, between the bottom helical spring support 7 and the removable base support 23. The hydraulic jacking arrangement 51 can be a hydraulic jacking assembly with hydraulic foot pumps, jacking and release pedals and hydraulic hoses for controlling the hydraulic cylinders 31. For example, the hydraulic jacking arrangement may have two hydraulic foot pumps mounted on a base with pedals connected (such that one pedal operates with a common lever arm) along with a pressure gauge, adaptor, coupler set, hydraulic hose with male coupling and load lowering valve one on each hydraulic cylinder to fine tune the lowering process connected in between the pump and the hydraulic cylinder 31.

A method for removing the helical springs is also provided. In practice, before the helical springs 3 can be removed the vibrating screen can be isolated and the operation can be stopped. The spacer bolts 60 can be removed. Optionally, the ledge 29 can be attached to the stationary base support 9 or be pre-connected to the stationary base support 9 and be rotated into place such that the ledge 29 is on the same plane of the bottom shelf 23b of the removable base support 23. Two hydraulic cylinders 31 can be inserted and attached onto the stationary base support 9 to support the bottom helical spring support 7. The two removable supports 35 can be inserted into the side supports 33 and secured with pins 70 and/or retainer pins. The removable supports 35 can be provided with e.g. polyurethane tips which can accommodate potential small differences in screen levels. The screen can then be jacked using the jacking arrangement 51, e.g. using the hydraulic foot pumps, such that there is a small gap, typically 5-10 mm, between the removable base support 23 and the bottom helical spring support 7. The removable base support 23 can then be slidably removed from under the bottom helical spring support 7 and e.g. be placed on the ledge 29. The bottom helical spring support 7, supported by the hydraulic cylinders 31 can be lowered thereby relieving the tension on the helical springs 3 such that the helical springs can be removed. New springs can be placed into the system. The jacking arrangement 51 can be used to raise the bottom helical spring support 7 such that the removable base support can be slidably moved into place from the ledge to under the bottom helical spring support 7. The bottom helical spring support 7 can then be lowered to secure the helical springs 3 in place. The spacer bolts 60 can be reattached and tightened and thereafter the removable supports 35 can be removed.

There are numerous advantages to the assembly 1, system 51I and method described herein. For example, first the invention eliminates the risk of working under a suspended load. Second, the invention eliminates the use of spring compressors, which are classed as high risk tools and are progressively being removed from the majority of mining sites. Third, the invention allows the helical springs to be replaced with minimal head height required due to e.g. removable base support 23 section on the base that allows the bottom helical spring support to be lowered reducing the overall height the vibrating screen needs to be lifted. Fourth, the invention incorporates a bolt on ledge to reduce manual handling risks.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF COMPONENTS

1—spring mount assembly
3—helical spring
3a—helical spring top end
3b—helical spring bottom end
5—top helical spring support
7—bottom helical spring support
7a—top shelf bottom helical spring support
7b—bottom shelf bottom helical spring support
8—support members bottom helical spring support
9—stationary base support
23—removable base support
23a—top shelf removable base support
23b—bottom shelf removable base support
25—support members removable base support
27—handles
29—ledge
31—hydraulic cylinders
33—side supports
35—removable posts
50—system
51—hydraulic jacking arrangement
53—gap
60—spacer bolts
70—tip
80—guide slot

The invention claimed is:

1. A spring mount assembly (1) for a vibrating screen, the spring mount assembly (1) comprising:
   a helical spring (3) having a top end (3a) and a bottom end (3b);
   a top helical spring support (5) disposed on the top end of the helical spring (3a) for supporting the top end of the helical spring (3a);
   a bottom helical spring support (7) disposed on the bottom end of the helical spring (3b) for supporting the bottom end of the helical spring (3b);
   a stationary base support (9);
   a removable base support (23) disposed on top of the stationary base support (9) between the stationary base support (9) and the bottom helical spring support (7);
   a hydraulic cylinder (31) for supporting the bottom helical spring support (7) on the stationary base support (9);
   side supports (33) attached to the stationary base support (9);
   removable posts (35) affixed to the side supports (33) and the top helical spring support (5); and
   a ledge (29) affixed to the stationary base support (9) for supporting the removable base support (23) when the removable base support (23) is slidably removed out from under the bottom helical spring support (7) and out from atop the stationary base support (9).

2. A spring mount assembly (1) for a vibrating screen, the spring mount assembly (1) comprising:
   a helical spring (3) having a top end (3a) and a bottom end (3b);
   a top helical spring support (5) disposed on the top end of the helical spring (3a) for supporting the top end of the helical spring (3a);
   a bottom helical spring support (7) disposed on the bottom end of the helical spring (3b) for supporting the bottom end of the helical spring (3b);
   a stationary base support (9);
   a removable base support (23) disposed on top of the stationary base support (9) between the stationary base support (9) and the bottom helical spring support (7);

a hydraulic cylinder (31) for supporting the bottom helical spring support (7) on the stationary base support (9);
side supports (33) attached to the stationary base support (9); and
removable posts (35) affixed to the side supports (33) and the top helical spring support (5);
wherein the removable base support (23) further comprises a top shelf (23a), a bottom shelf (23b) and support members (25) therebetween.

3. The spring mount assembly of claim 2, wherein the support members (25) comprise handles (27) attached to the support members (25) for slidably removing the removable base support (23) from under the bottom helical spring support (7).

4. The spring mount system of claim 1, wherein the ledge (29) is removably affixed to the stationary base support (9) such that the ledge (29) can be disconnected from the stationary base support (9) when it is not in use.

5. A spring mount assembly (1) for a vibrating screen, the spring mount assembly (1) comprising:
   a helical spring (3) having a top end (3a) and a bottom end (3b);
   a top helical spring support (5) disposed on the top end of the helical spring (3a) for supporting the top end of the helical spring (3a);
   a bottom helical spring support (7) disposed on the bottom end of the helical spring (3b) for supporting the bottom end of the helical spring (3b);
   a stationary base support (9);
   a removable base support (23) disposed on top of the stationary base support (9) between the stationary base support (9) and the bottom helical spring support (7);
   a hydraulic cylinder (31) for supporting the bottom helical spring support (7) on the stationary base support (9);
   side supports (33) attached to the stationary base support (9); and
   removable posts (35) affixed to the side supports (33) and the top helical spring support (5);
   wherein the removable base support (23) is disposed directly on top of and adjacent to the stationary base support (9) between the stationary base support (9) and the bottom helical spring support (7).

6. A spring mount assembly (1) for a vibrating screen, the spring mount assembly (1) comprising:
   a helical spring (3) having a top end (3a) and a bottom end (3b);
   a top helical spring support (5) disposed on the top end of the helical spring (3a) for supporting the top end of the helical spring (3a);
   a bottom helical spring support (7) disposed on the bottom end of the helical spring (3b) for supporting the bottom end of the helical spring (3b);
   a stationary base support (9);
   a removable base support (23) disposed on top of the stationary base support (9) between the stationary base support (9) and the bottom helical spring support (7);
   a hydraulic cylinder (31) for supporting the bottom helical spring support (7) on the stationary base support (9);
   side supports (33) attached to the stationary base support (9); and
   removable posts (35) affixed to the side supports (33) and the top helical spring support (5);
   wherein the side supports (33) comprise slots (80) for receiving a portion of the bottom helical spring support (7).

7. A system (50) for removing the helical springs (3) of the spring mount assembly (1) of claim 2, further comprising a hydraulic jacking arrangement (51) for controlling hydraulic cylinders (31) and for creating a gap (53) between the bottom helical spring support (7) and the removable base support (23).

8. The system (50) of claim 7, wherein the hydraulic jacking arrangement (51) comprises one or more of the following: a hydraulic foot pump mounted on a base, a pressure gauge, an adaptor, a coupler set, a hydraulic hose with a male coupling and a load lowering valve disposed on each hydraulic cylinder (31).

9. The spring mount assembly of claim 2, where the vibrating screen is a single spring design.

10. The spring mount assembly of claim 2, wherein the removable posts (35) comprise tips (70).

11. A spring mount assembly (1) for a vibrating screen, the spring mount assembly (1) comprising:
    a helical spring (3) having a top end (3a) and a bottom end (3b);
    a top helical spring support (5) disposed on the top end of the helical spring (3a) for supporting the top end of the helical spring (3a);
    a bottom helical spring support (7) disposed on the bottom end of the helical spring (3b) for supporting the bottom end of the helical spring (3b);
    a stationary base support (9);
    a removable base support (23) disposed on top of the stationary base support (9) between the stationary base support (9) and the bottom helical spring support (7);
    a hydraulic cylinder (31) for supporting the bottom helical spring support (7) on the stationary base support (9);
    side supports (33) attached to the stationary base support (9); and
    removable posts (35) affixed to the side supports (33) and the top helical spring support (5);
    wherein the bottom helical spring support (7) further comprises a top shelf (7a), a bottom shelf (7b) and support members (8) therebetween.

12. The system of claim 7, wherein the gap (53) is between 5 and 10 mm.

13. The system of claim 2, wherein the helical springs (3) are coated with a protectant.

14. A method for removing the helical springs (3) of the spring mount assembly (1) of claim 2, comprising:
    inserting hydraulic cylinders (31) between the bottom helical spring support (7) and the stationary base support (9) such that the hydraulic cylinders (31) are supporting the bottom helical spring support (7) on the stationary base support (9);
    inserting removable posts (35) affixed to the side supports (33) and the top helical spring support (5);
    using a hydraulic jacking arrangement (51) to control the hydraulic cylinders (31) in order to raise the bottom helical spring support (7) such that there is a gap (53) between the bottom helical spring support (7) and the removable base support (23);
    removing the removable base support (23);
    lowering the bottom helical spring support (7) such that it disposed on the stationary base support (9);
    relieving tension on the helical springs (3); and
    removing the helical springs (3).

15. The method of claim 14, further comprising:
    re-inserting replacement helical springs (3);
    raising the bottom helical spring support (7);
    re-inserting the removable base support (23);
    removing the removable posts (35); and
    lowering the bottom helical spring support (7) such that it disposed on the removable base support (23).

16. The method of claim 15, wherein the step of removing the removable base support (23) comprises sliding the removable base support (23) onto a ledge (29).

\* \* \* \* \*